US008065332B2

(12) United States Patent
Ramzan et al.

(10) Patent No.: US 8,065,332 B2
(45) Date of Patent: Nov. 22, 2011

(54) METHOD AND APPARATUS FOR COMMUNICATION EFFICIENT PRIVATE INFORMATION RETRIEVAL AND OBLIVIOUS TRANSFER

(75) Inventors: Zulfikar Amin Ramzan, San Mateo, CA (US); Craig B. Gentry, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 437 days.

(21) Appl. No.: 12/365,830

(22) Filed: Feb. 4, 2009

(65) Prior Publication Data
US 2009/0193000 A1    Jul. 30, 2009

Related U.S. Application Data

(62) Division of application No. 11/133,836, filed on May 19, 2005, now Pat. No. 7,620,625.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 6,438,554 | B1 | 8/2002 | Di-Crescenzo et al. |
| 7,191,333 | B1 | 3/2007 | Maddury et al. |
| 2002/0083060 | A1* | 6/2002 | Wang et al. ............... 707/10 |
| 2004/0250100 | A1 | 12/2004 | Agrawal et al. |
| 2005/0097063 | A1 | 5/2005 | Benaloh |

OTHER PUBLICATIONS

Office Action dated Feb. 24, 2009 for parent U.S. Appl. No. 11/133,836, filed May 19, 2005, 6 pages.
Cachin, et al., "Computationally private information retrieval with polylogarithmic communication", Proceeding of Eurocrypt, Online 1999, accessed at http://www.springerlink.com, pp. 402-414.
Beimel, et al., "Breaking the $0(n^{1/(2k-1)})$ barrier for information-theoretic private information retrieval", 43rd Annual Symposium on Foundations of Computer Science, Vancouver, Canada, Nov. 2002, pp. 261-270.
PCT Written Opinion for PCT Appln No. US 2005/017618, mailed Nov. 30, 2006 (6 pages).
US Office Action for U.S. Appl. No. 12/365,833, Oct. 15, 2010, 8 pgs.
Japanese Office Action for corresponding Japanese Patent Application No. 2007-527450, Apr. 5, 2011, 15 pgs, *English Translation*.

(Continued)

*Primary Examiner* — Isaac M Woo
(74) *Attorney, Agent, or Firm* — Blakely, Sokoloff, Taylor & Zafman LLP

(57) ABSTRACT

A method, article of manufacture and apparatus for performing private retrieval of information from a database is disclosed. In one embodiment, the method comprising obtaining an index corresponding to information to be retrieved from the database and generating a query that does not reveal the index to the database. The query is an arithmetic function of the index and a secret value, wherein the arithmetic function includes a multiplication group specified by a modulus of a random value whose order is divisible by a prime power, such that the prime power is an order of the random value. The secret value is an arithmetic function of the index that comprises a factorization into prime numbers of the modulus. The method further comprises communicating the query to the database for execution of the arithmetic function against the entirety of the database.

15 Claims, 13 Drawing Sheets

OTHER PUBLICATIONS

Cachin et al., "Computationally Private Information Retrieval with Polylogarithmic Communication", International Conference on the Theory and Applicationn of Cryptographic Techniques, May 1999. pp. 402-414, Prague, Czech Republic.

US Office Action for related U.S. Appl. No. 12/365,840, May 3, 2011, 7 pgs.

US Notice of Allowance for related U.S. Appl. No. 12/365,837, May 19, 2011, 9 pages.

* cited by examiner

Compute e such that e such that
$e \equiv r_{ij} \pmod{p_i}$ for all $i$
901

Compute the value $\chi^e \pmod{n}$
902

Send this value to the querier
903

FIG. 9

Recovery $r_{ij}$
1001

Recover bit $C_{ij}$ from the oblivious transfer response $r_{ij}$
1002

FIG. 10

METHOD AND APPARATUS FOR COMMUNICATION EFFICIENT PRIVATE INFORMATION RETRIEVAL AND OBLIVIOUS TRANSFER

PRIORITY

This is a divisional of application Ser. No. 11/133,836, filed on May 19, 2005 now U.S. Pat. No. 7,620,625, entitled "Method And Apparatus For Communication Efficient Private Information Retrieval And Oblivious Transfer," and assigned to the corporate assignee of the present invention and incorporated herein by reference.

FIELD OF THE INVENTION

This invention relates in general to cryptography and in particular to the problems of private information retrieval and oblivious transfer.

BACKGROUND OF THE INVENTION

Consider, the following scenario with two fictitious parties Alice and Bob. A party Bob owns a database D consisting of m data elements. A user Alice wishes to access this database, and establishes an agreement with Bob whereby she can achieve such access. However, for privacy reasons, Alice does not want Bob to know what items she is querying in the database. Naturally, one can imagine a number of scenarios in which database privacy is desired.

The problem area to address the above concerns is known in the art and referred to herein as Private Information Retrieval (PIR). When concerned with maintaining database privacy (for example, by preventing the user from learning any more information than it should), the problem area is sometimes referred in the art and herein as either Symmetric Private Information Retrieval (SPIR) or as Oblivious Transfer.

One trivial scheme for achieving the goal of privacy is for the database owner (in this case Bob) to send the entire database to Alice. If the database contains m bits, then the total communication complexity is $O(m)$, where this notation for purposes herein means $a \cdot m + b$, where a and b are numbers. Alice can make any query, and Bob will trivially have no information about Alice's query. Of course, this solution is completely impractical for even a moderately-sized database. Additionally, this type of scheme does not satisfy the need for maintaining database privacy.

Some schemes require total communication that is super logarithmic in the size of the database or in other words, $O((\log_2 m)^d)$, where m is the number of items in the database and d is greater than 1. The best known theoretical lower bound for total communication in such a scenario is $O(\log_2 m)$.

Chor, Kushilevitz, Goldreich, and Sudan in Private Information Retrieval, Journal of the ACM, 45, 1998 (earlier version in FOCS 95) considered the information-theoretic case wherein the security analysis requires no computational assumptions. For this case, they show that if only a single database is used, then m bits must be communicated. On the other hand, if several replicas of identical databases are used (subject to the restriction that these databases do not communicate with each other), then one can achieve a scheme that does not require transmitting m bits. They determined that there is a 2-database private information retrieval scheme with communication complexity $O(m^{1/3})$ subject to the restriction that the databases do not communicate with one another, and for any constant $k \geq 2$, there is a k-database private information retrieval scheme with communication complexity $O(m^{1/k})$ subject to the restriction that the databases do not communicate with one another.

Ambainis in *Upper Bound on the communication complexity of private information retrieval*, in Proc. of the 24th ICALP, 1997, showed that for any constant $k \geq 2$, there is a k-database private information retrieval scheme with communication complexity $$O(m^{\frac{1}{2k-1}}),$$

subject to the restriction that the databases do not communicate with one another, and for $k=\theta(\log m)$, there is a $\theta(\log m)$-database private information retrieval scheme with communication complexity $O(\log^2 m - \log \log m)$, again subject to the restriction that the databases do not communicate with one another.

Chor and N. Gilboa, in *Computationally Private Information Retrieval*, Proceedings of 29th STOC, pp. 304-313, 1997, show that for every $\epsilon > 0$, there is a 2-database private information retrieval scheme with communication complexity $O(m^\epsilon)$. Their scheme requires the existence of pseudo-random generators. It is well known in the art that such generators can be constructed if one-way functions exist.

E. Kushilevitz and R. Ostrovsky, in *Replication is not needed: single database, computationally private information retrieval*, in Proceedings of FOC '97, pp. 364-373, used a computational intractability assumption to achieve a single database (i.e., $k=1$) private information retrieval scheme whose communication complexity is less than m. Under the well known Quadratic Residuocity assumption, they demonstrated that for any $\epsilon > 0$, there a single-database computational private information retrieval scheme whose communication complexity is $O(m^\epsilon)$. To construct such a scheme, they first demonstrated a basic scheme with communication complexity $O((2\sqrt{m}+1)-k)$ where k is a security parameter. Under the assumption that $k=m^c$ for some constant c, the resulting scheme achieves communication complexity $$O(m^{\frac{1}{2}+c}).$$

Next, Kushilevitz and Ostrovsky demonstrated that if one of the steps in this scheme could itself be replaced by a single-database computational private information retrieval protocol, then the resulting communication complexity would be lower. Using this idea, they proposed a recursive scheme whose communication complexity is $$O\left(m^{\frac{1}{L+1}} \cdot (m^L + L \cdot k)\right)$$

where L is the number of levels of recursion. By making an assumption that the security parameter is $k=m^c$ for some constant c, and setting $L+O(\sqrt{\log m/\log k})$, the communication complexity is $n^{O(\sqrt{c})}$.

Subsequently, Cachin, Micali, and Stadler in *Computational Private Information Retrieval with Polylogarithmic Communication*, in Proc. of Eurocrypt 1999, LNCS, pages 402-414. Springer-Verlag, 1999, showed how to construct a single-database computational private information retrieval scheme for which the communication complexity is polylogarithmic in the size of the database; i.e., $O(\log^d m)$, where d is a constant greater than 1. For the recommended parameters in their scheme, d=6, which makes the actual total communication complexity $O(\log^6 m)$. The Cachin-Micali-Stadler scheme is based on two computational intractability assumptions. The first assumption is the Φ-hiding assumption, which states, roughly, that given a composite integer n and a small prime p, it is hard to determine whether p divides ø(n) with probability non-negligibly better than ½. The second assumption is the Φ-sampling assumption, which states, roughly, that it one can efficiently find a random composite n such that p divides Φ(n).

In order for the user to obtain the $i^{th}$ bit of an m-bit database, he must at least send some encoding of i. Thus, in any scheme O(log m) bits have to be communicated. However, there is still a gap between the Cachin-Micali-Stadler scheme (which has complexity $O(\log^6 m)$, and the theoretical lower bound of O(log m).

Chang in *Single-Database Private Information Retrieval with Logarithmic Communication*, in Proc. of $9^{th}$ Australasian Conference on Information Security and Privacy (ACISP 2004), Sydney, Australia, Lecture Notes in Computer Science, Springer Verlag, demonstrated the first single database computational private information retrieval scheme for which the server side communication complexity is O(log m). The scheme utilizes Paillier's cryptosystem as a building block and thus is secure as long as that cryptosystem is. The Paillier cryptosystem, in turn, can be shown to be secure assuming the composite residuosity assumption, which is an extension of the Quadratic-Residuosity assumption (which is the same assumption used in the Kushilevitz-Ostrovsky scheme described above). Roughly speaking, the composite residuosity assumption states that it is computationally intractable to decide whether a random element in $(Z/n^2 Z)^*$ has an $n^{th}$ root modulo $n^2$. Chang's scheme is a special case of a scheme due to Julian Stern that demonstrated how to construct single database private information retrieval schemes from almost any semantically secure additive homomorphic encryption scheme, of which the Paillier cryptosystem is one such example. However, the user-side communication complexity of Chang's scheme is $O(m^\epsilon \cdot \log m)$, which means that the total communication complexity is $O(m^\epsilon \cdot \log m)$.

Thus, from the perspective of overall communication complexity, the Cachin-Micali-Stadler scheme is better. Nonetheless, there was still a significant gap between the $O(\log^6 m)$ complexity of this scheme and the theoretical lower bound of O(log m).

SUMMARY OF THE INVENTION

A method, article of manufacture and apparatus for performing private retrieval of information from a database is disclosed. In one embodiment, the method comprising obtaining an index corresponding to information to be retrieved from the database and generating a query that does not reveal the index to the database. The query is an arithmetic function of the index and a secret value, wherein the arithmetic function includes a multiplicative group specified by a modulus of a random value whose order is divisible by a prime power, such that the prime power is an order of the random value. The secret value is an arithmetic function of the index that comprises a factorization into prime numbers of the modulus. The method further comprises communicating the query to the database for execution of the arithmetic function against the entirety of the database.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 9 is a flow diagram of one embodiment of a process for the oblivious transfer query generation.

FIG. 10 is a flow diagram of one embodiment of a process for the oblivious transfer response retrieval.

DETAILED DESCRIPTION OF THE PRESENT INVENTION

Figure 1:
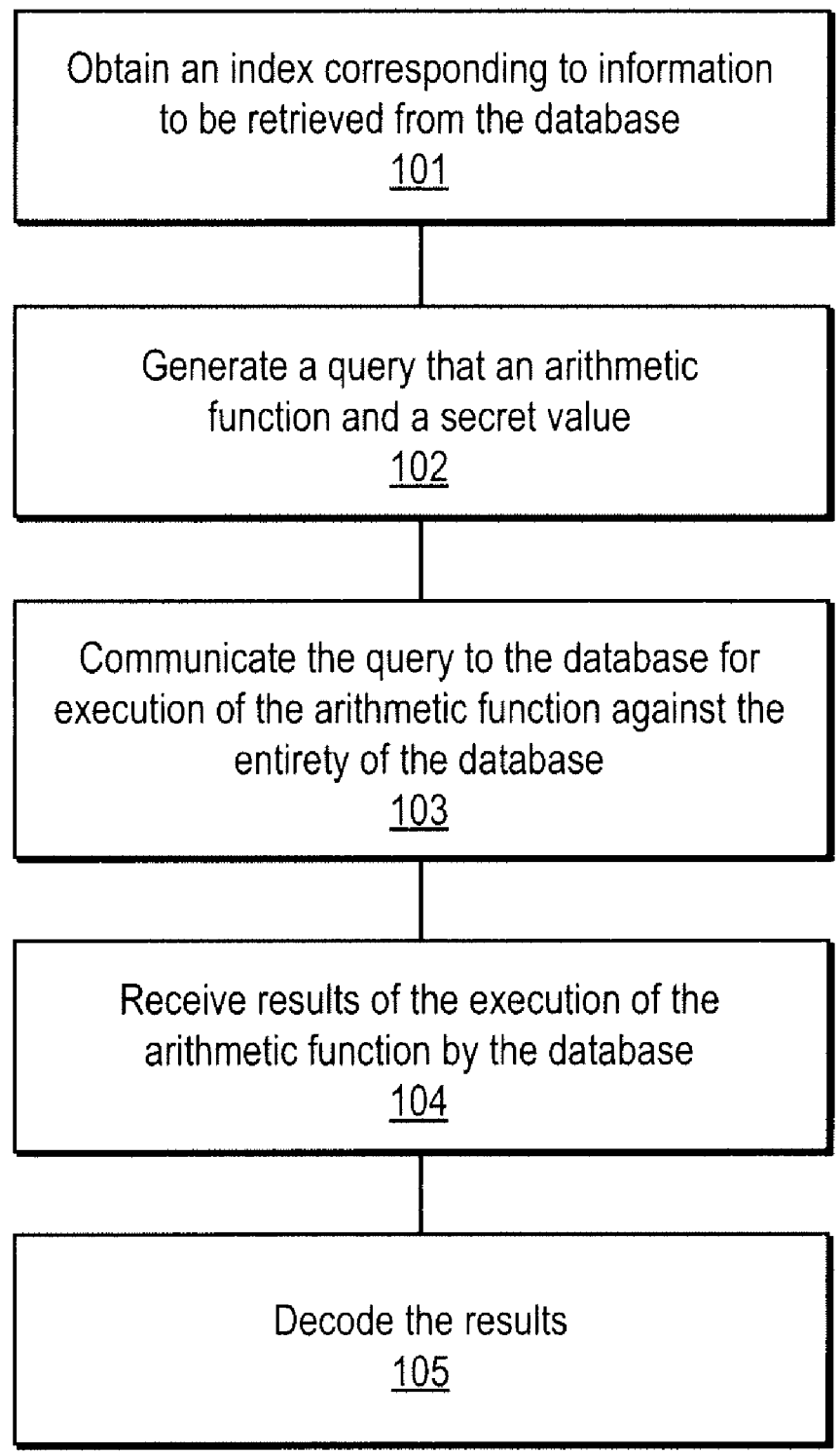
FIG. 1 is a flow diagram of one embodiment of a process for privately retrieving information from a database.

Private information retrieval techniques are described herein. These techniques include secure private information retrieval techniques. Embodiments of the present invention include schemes for secure private information retrieval that are efficient with respect to the computation requirements of the querying party and the database owner as well as the bandwidth requirements of the channels over which these parties communicate. In one embodiment, a user can make queries to a database in such a manner that the user obtains the correct answer to the query without allowing the database owner to determine which query was requested. In another embodiment, the database owner can ensure that the user cannot learn more information than a database might be willing to let it. These embodiments include schemes for which that communication is, in total, logarithmic in the size of the database. That is, the communication complexity is $O(\log_2 m)$, which falls between total communication complexity of these schema and the theoretical lower bound of O(log m), which is typically sought to be achieved. In other words, the total communication required during the interactions is O(log m).

In one embodiment, the communication occurs between a client and a server, where the client sends O(log m) bits to the server and the server sends O(log m) bits to the client.

It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Definition of Terms

Throughout the following description, m denotes the number of elements in the database, and n denotes a composite modulus that is assumed to be hard to factor efficiently. For simplicity, each element of the database is assumed to be a single bit (0 or 1). It will be apparent to a person of ordinary skill in the art after having read the subsequent definition that the methods, components, and systems described herein can be modified to handle an arbitrary number of bits (for example, by simple iteration).

Also for purposes herein, a function $f(n)$ is negligible if, for any polynomial function $q(n)$, there is a value $n_0$ such that for all $n > n_0$, it holds that $f(n) < 1/q(n)$. One example of such a negligible function is $f(n) = \frac{1}{2}^n$.

If a and b are two integers with $a \leq b$, let [a, b] denote the set of integers between a and b inclusive. That is, $[a, b] = \{c \in Z | a \leq c \leq b\}$. If S is a set of elements, and D is a sampleable probability distribution on S, we denote by $$s \xleftarrow{D} S$$

the process of picking an element s from S according to the distribution D.

The security of many cryptographic inventions relies upon making certain computational intractability assumptions; for example, one may try to prove that a cryptosystem is secure so long as it is difficult to decompose a specific number into its prime factors efficiently. The term "computational" is often used to identify this class of cryptosystems (i.e., one that is secure so long as it is difficult to decompose a specific number into its primary factors efficiently. Thus, single-database computational private information retrieval schemes denote that some computational assumption is required in order to establish the security of the scheme. The term "information theoretic" or "unconditional" is often used in the art in conjunction with schemes that are mathematically seen to meet a specific meaningful security definition without making any type of assumption.

With respect to assumptions, often times one assumption implies another. Typically this is shown in the art by providing a transformation (often known in the art as a reduction) that converts a mechanism for violating the second assumption to a mechanism for violating the first assumption. In such cases, the first assumption is called "stronger", while the second is called "weaker." In general, weaker assumptions are preferable.

Computational Private Information Retrieval (CPIR)

For purposes herein, a polylogarithmic single database computational private information retrieval scheme conforms to the following definition.

Definition 1 (Polylogarithmic PIR). Let $D(\bullet, \bullet, \bullet)$, $Q(\bullet, \bullet, \bullet)$, and $R(\bullet, \bullet, \bullet, \bullet, \bullet)$, be efficient algorithms. By definition, $(D, Q, R)$ is a fully polylogarithmic CPIR scheme if there exist constants $a, b, c, d > 0$ such that, 1. (Correctness) For all $m$, all $m$-bit strings $B$, all $i \in [1, m]$, and all $k$, $$Pr\left[(q, s) \xleftarrow{R} Q(m, I, 1^k);\right.$$

$$\left. r \xleftarrow{R} D(B, q, 1^k) : R(m, i, (q, s), r; 1^k) = B_i\right] > 1 - 2^{-ak}$$

2. (Privacy) For all $m$, all $(I, j) \in [1, m]$, all $k$ such that $k > \max(k_0, \log^b m)$, and all $2^{ck}$-gate circuits $A$, $$Pr\left[(q, s) \xleftarrow{R} Q(m, i, 1^k) : A(m, q, 1^k) = 1\right] -$$

$$Pr\left[(q; s) \xleftarrow{R} Q(m, j, 1^k) : A(m, q, 1^k) = 1\right] < 2^{-dk}$$

where a, b, c and d use the fundamental constants of the CPIR; B constitutes the contents of the database (which may be stored on a server component) and consists of individual bits; D is the database response generation method; the pair (Q,R) constitute the query generation method and the reconstruction method respectively; s is a secret (associated to query q and used to "reconstruct" the response of the database from query q); r is the response; and k is the security parameter. In one embodiment, the security parameter k is set in accordance with the level of security desired by an individual, while the remaining parameters are set based on the features of the database (e.g., its size).

To ensure that a polylogarithmic scheme has purely logarithmic total communication complexity, b=1 and |q| and |r| are O(k).

The Φ-Hiding Assumption and its Variants

A number of assumptions relevant to proving the security of the embodiment defined herein. These assumptions are defined in terms of a variable sampling distribution D. Thereafter, specific sampling methods that are candidates for D are given.

The original Φ-Hiding Assumption.

Definition 2 (The Φ-Hiding Assumption). There exist e, f, g, h>0 such that [[1]] for all k>h, there exists a sampling algorithm S(•) such that for all k-bit primes p, S(p) outputs a random $k^f$-bit number $n \in H_{kf}^k$ that φ-hides p, and [[2]] for all k>h and polynomial time algorithms C, $$Pr\left[n \xleftarrow{R} H_{kf}^k; p_0 \xleftarrow{R} H^k(n); p_1; b \xleftarrow{R} \{0,1\}: C(n, p_b) = b\right] < \frac{1}{2} + \epsilon.$$

Note that the original assumption uses the set of k-bit primes for k>h. To generalize, consider a set of permissible sets denoted P. For example, the set of permissible sets could be odd prime powers in a certain range. Next, in the original Φ-hiding assumption, the sampling algorithm is uniformly random. This may be generalized by simply requiring that there be some efficiently computable distribution that makes the problem hard. Therefore, the original form is a stronger assumption.

Definition 3 (The Φ-Hiding Assumption for P). There is a constant f, such that for any P∈P, there is an efficiently computable distribution D for which $$Pr\left[p_0 \xleftarrow{R} P; p_1 \xleftarrow{R} P - p_0; n \xleftarrow{D} H_{max(|P|f,k)}^{p_0};\right.$$
$$\left. b \xleftarrow{R} \{0,1\}: C(n, p_b, P, D) = b\right] < \frac{1}{2} + \epsilon$$

The above assumption is modified in two ways. First, it is assumed that it is true even if $p_0$ is not randomly chosen. Second, it is assumed that fewer bits are needed in the modulus to maintain security.

In one embodiment, security for a fixed $p_0$ is assumed since the same prime numbers are used for each new query, whereas the Cachin-Micali-Stadler scheme generates different primes for each database bit for each query. Below is the more formal statement of the definition:

Definition 4 (The Linear Φ-Hiding Assumption for P). Let neg(k) be a negligible function in k. There is a constant f, such that for any P∈P, there is an efficiently computable distribution D for which $$Pr\left[p_0 \xleftarrow{R} P; p_1 \xleftarrow{R} P - p_0; n \xleftarrow{D} H_{max(f|P|k)}^{p_0};\right.$$
$$\left. b \xleftarrow{R} \{0,1\}: C(n, p_b, P, D) = b\right] < \frac{1}{2} + neg(k)$$

Definition 5 (The Strong Linear Φ-Hiding Assumption for P). Let neg(k) be a negligible function in k. There is a constant f, such that P∈P and any $p_0$∈P, there is an efficiently computable distribution D for which $$Pr\left[p_1 \xleftarrow{R} P - p_0; n \xleftarrow{D} H_{max(f|P|k)}^{p_0}; b \xleftarrow{R} \{0,1\}: C(n, p_b, P, D) = b\right] <$$
$$\frac{1}{2} + neg(k)$$

Note that revealing a large divisor of Φ(n) may compromise n's factorization. Namely, if $p > n^{1/4}$ is a divisor of Φ(n), then it is known in the prior art that one can easily factor n given (n; p). Consequently, f is at least 4. But nothing similar is known when p is smaller.

The Sampling Distribution

Given a set P, a distribution D may be defined for which the various Φ-hiding assumptions are more likely to hold. In one embodiment, the Φ-hiding assumption does not hold for p=3 when n is the product of two prime numbers and D is the uniform distribution. For example, suppose that $n = Q_1 Q_2 \equiv 2 \pmod 3$ for prime numbers $Q_1$ and $Q_2$. Then, one can tell that one of $Q_1$ and $Q_2$ is congruent to 1 mod 3. Thus, it is obvious that 3 divides $\phi(n) = (Q_1 - 1)(Q_2 - 1)$.

One can make a similar argument for prime numbers greater than 3. For example, suppose D draws two-prime composite numbers uniformly from $H_{max(f|P|k)}^p$ and $H_{max(f|P|k)}^{-p}$. Then, one can distinguish which set D drew from simply by considering D's output modulo p. Essentially, the numbers drawn from the first set will be uniform modulo p, since one prime number is congruent to 1 modulo p and the other prime number can be congruent to anything (except 0) modulo p. However, the numbers from the second set will not be uniform modulo p. In this case, both prime numbers are congruent to some number in [2, p−1] modulo p. Assume p is prime; then, for a∈[1, p−1], the product n of two such prime numbers has a $$\frac{p-3}{(p-2)2}$$

probability of satisfying n≡a(mod p) if a≠1, but a slightly higher probability of $$\frac{p-2}{(p-2)2} = \frac{1}{p-2} \text{ if } a = 1.$$

A similar situation occurs if p is composite.

Accordingly, in one embodiment, distribution D is adjusted so that the distinguishing advantage is negligible. One solution that achieves this aim is to adjust the distribution D so that, when it samples from $H_{max(f|p|k)}$, it samples with a distribution modulo p that conforms to the non-uniform distribution described above. This can be accomplished by first sampling with a uniform distribution and then rejecting the output with certain probabilities.

Database Queries, Responses and Reconstruction

FIG. 1 is a flow diagram of one embodiment of a process for privately retrieving information from a database. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is part of a client device (e.g., a computer system, a mobile device (e.g., a cellular phone)).

Referring to FIG. 1, the process begins by processing logic obtaining an index corresponding to information to be retrieved from the database (processing block 101). The index represents an address specifying a specific location in the database.

Using the index, processing logic generates a query that is an arithmetic function of the index and a secret value that is an arithmetic function of the index (processing block 102). The arithmetic function includes a modulus and a random value and represents an encoding of the index to avoid revealing the index to the database. The secret value comprises the factorization into prime numbers of the modulus. In one embodiment, the query comprises O(log m) bits, wherein m equals the number of elements stored in the database.

After generating the query, processing logic communicates the query to the database for execution of the arithmetic function against the entirety of the database (processing block 103).

Thereafter, processing logic receives results of the execution of the arithmetic function by the database (processing block 104) and decodes the results (processing block 105). In one embodiment, the total amount of information exchanged with the database is less than the total amount of information stored in the database.

An Example of a Process for Generating Queries

In what follows, let $\sigma:[1; m] \to P$ be a mapping of the set of database indices to a set of prime powers given by $\sigma(i)=p_{i'}=p'_{i'}{}^{ci'}$, $i'=\lceil i/l \rceil$, $p'_j$ where is prime, and $p_j$ is the $j^{th}$ prime power in P. It is assumed for purposes herein that P and the $\sigma$ mapping is known to both the querier and the database.

Figure 2:
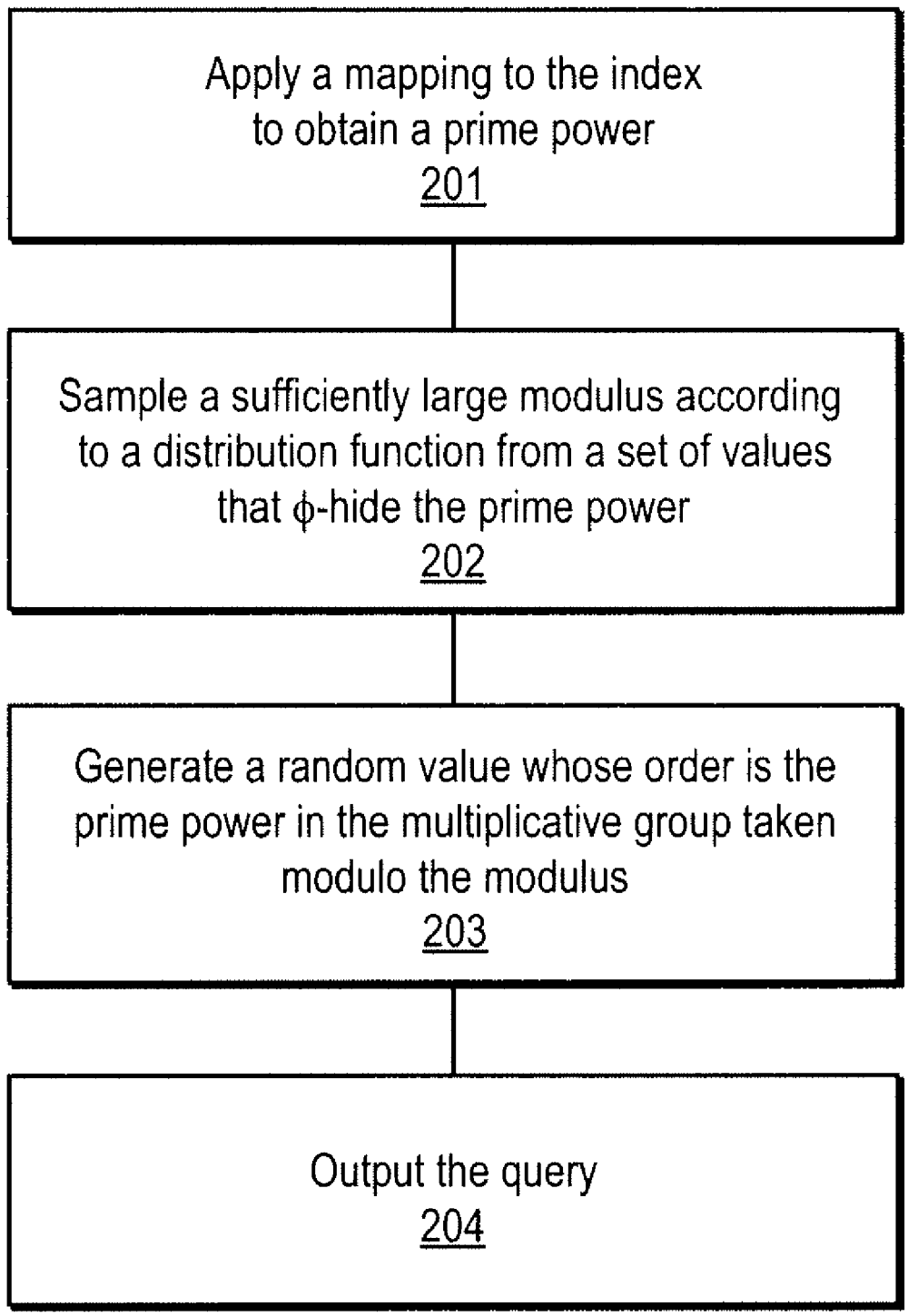
FIG. 2 is a flow diagram of one embodiment of a process for generating queries.

FIG. 2 is a flow diagram of one embodiment of a process for generating queries. The process is performed by processing logic that may comprise hardware (e.g., circuitry, dedicated logic, etc.), software (such as is run on a general purpose computer system or a dedicated machine), or a combination of both. Processing logic may comprise firmware.

In one embodiment, the process has a number of values as inputs (m, I, $k_0$, P, D, $\sigma$), where m is the number of bits in the database; $i \in [1,m]$ is the index of the database representing the item in which querier is interested; $k_0$ is a security parameter that can be increased to provide greater security; P is a set of prime powers; D is a distribution over $H_{max(f|P|k_0)}$ and $\sigma$ is the above-mentioned mapping from [1,m] to P.

Referring to FIG. 2, the process begins by processing logic applying a mapping to the index to obtain a prime power (processing block 201). In one embodiment, the prime power is obtained by computing $\sigma(i)=p_{i'}$.

With the prime power, processing logic samples a sufficiently large modulus according to a distribution function from a set of values that $\phi$-hide the prime power (processing block 202). That is, the modulus is large enough to make factoring the modules difficult. For example, in one embodiment, 1024-bits is considered sufficient. However, a larger modulus may be used. In one embodiment, this occurs by generating $$n \xleftarrow{D} H_{max(f|P|,k_0)}^{p_{i'}}.$$

After sampling the modulus, processing logic generates a random value whose order is the prime power in the multiplicative group taken modulo the modulus (processing block 203). In one embodiment, the random value is generated by generating random $x \in (Z/nZ)^*$ with order divisible by $p_{i'}$.

After generating the random value, processing logic outputs the query (processing block 204). In one embodiment, the query $q=(n; x)$ and a secret s that represents n's factorization.

An Example of a Process for Generating a Response

Figure 3:
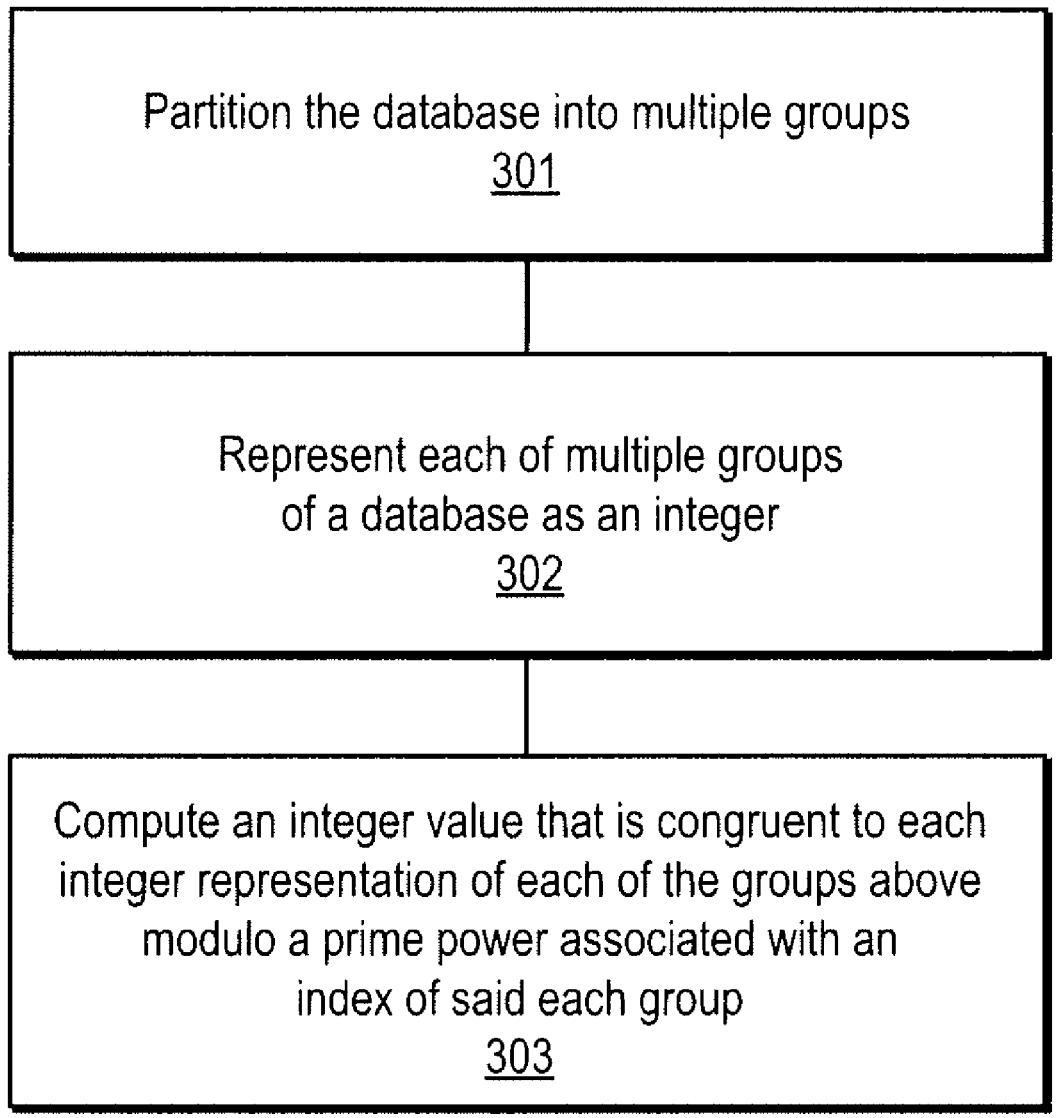
FIG. 3 is a flow diagram of one embodiment of a process for generating response.

The database receives the query from the querier and, in response thereto, generates a response that is sent to the querier. FIG. 3 is a flow diagram of one embodiment of a process for generating response. The process is performed by processing logic that may comprise hardware (e.g., circuitry, dedicated logic, etc.), software (such as is run on a general purpose computer system or a dedicated machine), or a combination of both. Processing logic may comprise firmware. The processing logic may be part of the database.

In one embodiment, the process has a number of values as inputs (B, n, x, P, $\sigma$), where B represents the contents of the database viewed as an m-bit string; n is a composite modulus; X is an element from $(Z/n\,Z)^*$; P is a set of prime powers; and $\sigma$ is the above-mentioned mapping from [1,m] to P.

Referring to FIG. 3, the process begins by partitioning the database into multiple groups (processing block 301). In one embodiment, the database B is partitioned into $C_1 \| C_2 \| \ldots \| C_{m'}$, where $m'=\lceil m/l \rceil$ and $|C_1|=|C_2|=|C_{m'-1}|=l$ After partitioning the database into groups, processing logic represents each of multiple groups of a database as an integer (processing block 302). In one embodiment, this occurs by expressing each $C_i$ as a number $C'_i \in [0,2^l-1]$. That is, view $C_i$ as the base 2 representation of a number in $[0,2^l-1]$ call this number $C'_i$.

Next, processing logic computes an integer value that is congruent to each integer representation of each of the groups above modulo a prime power associated with an index of said each group (processing block 303). In one embodiment, computing the integer value occurs by setting e to be the smallest positive integer such that $e \equiv C'_i \pmod{p_{i'}}$ for all i.

With the integer value, processing logic generates a response (processing block 304). In one embodiment, processing logic generates a response by exponentiating a base input value provided with an exponent equal to the integer value and performing an arithmetic modulo operation with a modulus value. In one embodiment, generating the response comprises outputting the response $r=x^e \pmod{n}$.

Notice that the first three operations of this technique are independent of the query. Therefore, in an alternate embodiment of the present invention, these three operations can be pre-computed.

An Example Process for Reconstruction

Figure 4:
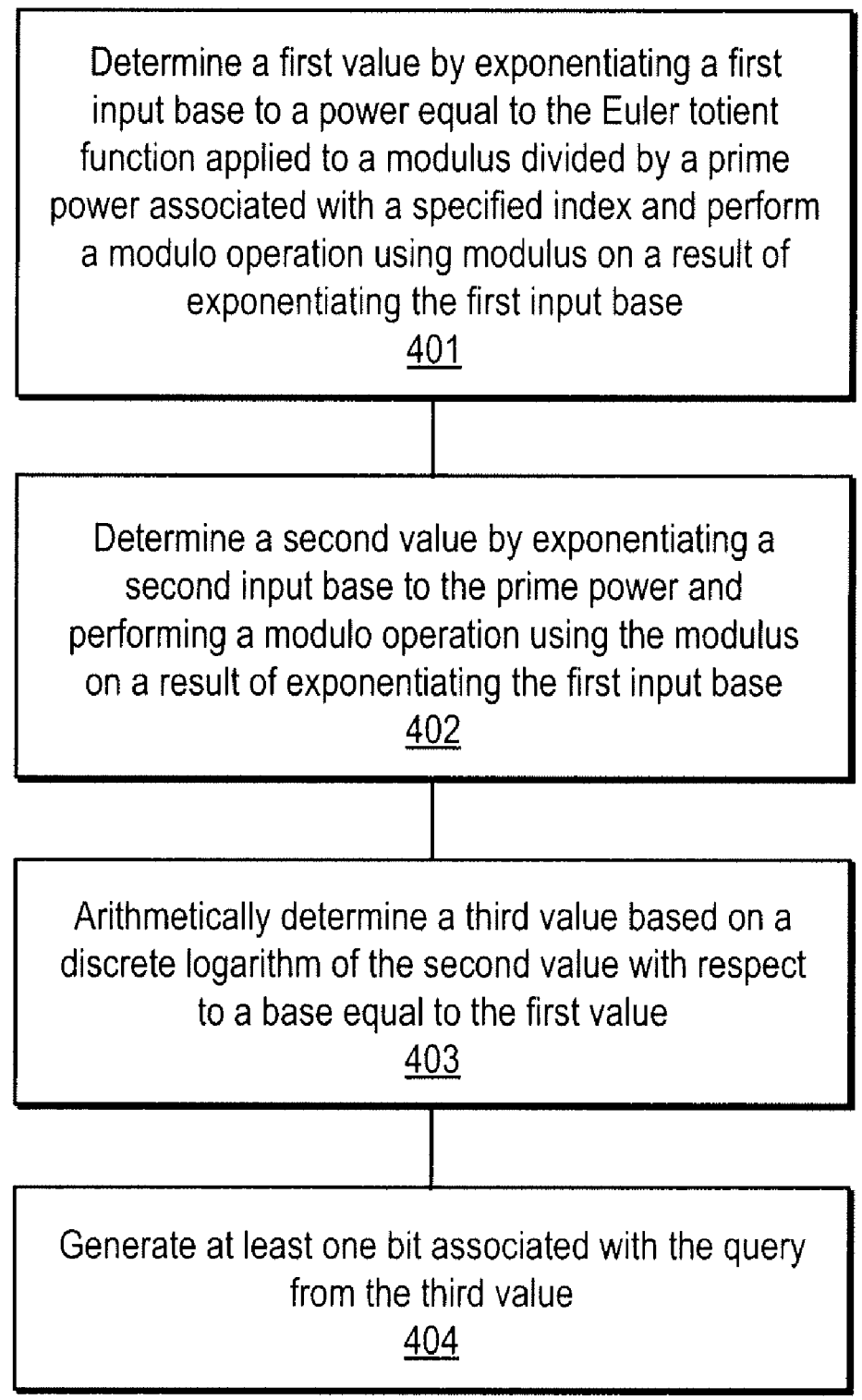
FIG. 4 is a flow diagram of a process for performing response retrieval.

After the database provides a response to the query to the querier, the querier performs reconstruction on the results to retrieve the response. FIG. 4 is a flow diagram of a process for performing response retrieval. The process is performed by processing logic that may comprise hardware (e.g., circuitry, dedicated logic, etc.), software (such as is run on a general purpose computer system or a dedicated machine), or a combination of both. Processing logic may comprise firmware.

The processing logic may be part of the database.

In one embodiment, the process has a number of values as inputs (m, i, n, $\chi$, r), where m is the number of bits in the database; i$\in$[1,m] is the index of the database representing the item in which querier is interested; n is a composite modulus; x is an element from $(Z/n\ Z)^*$; and r is a value in $(Z/n\ Z)^*$.

Referring to FIG. 4, the process begins by processing logic determining a first value by exponentiating a first input base to a power equal to the Euler totient function applied to a modulus divided by a prime power associated with a specified index and performing a modulo operation using a modulus on a result of exponentiating the first input base (processing block 401). In one embodiment, the second value is generated by computing $y=x^{\phi(n)/p_i}$ (mod n).

After determining the first value, processing logic determines a second value by exponentiating a second input base to the prime power and performing a modulo operation using the modulus on a result of exponentiating the first input base (processing block 402). In one embodiment, the second value is generated by computing and $z=r^{\phi(n)/p_i}$ (mod n)

After determining the second value, processing logic arithmetically determines a third value based on a discrete logarithm of the second value with respect to a base equal to the first value (processing block 403). In one embodiment, the third value is generated by computing $c'_i$, which is the discrete logarithm (modulo n) of z for base y.

Once the third value is generated, processing logic generates at least one bit associated with the query from the third value (processing block 404). In one embodiment, generating at least one bit comprises outputting $B_i$, which is the (i mod l) bit of $C'_i$.

Figure 5:
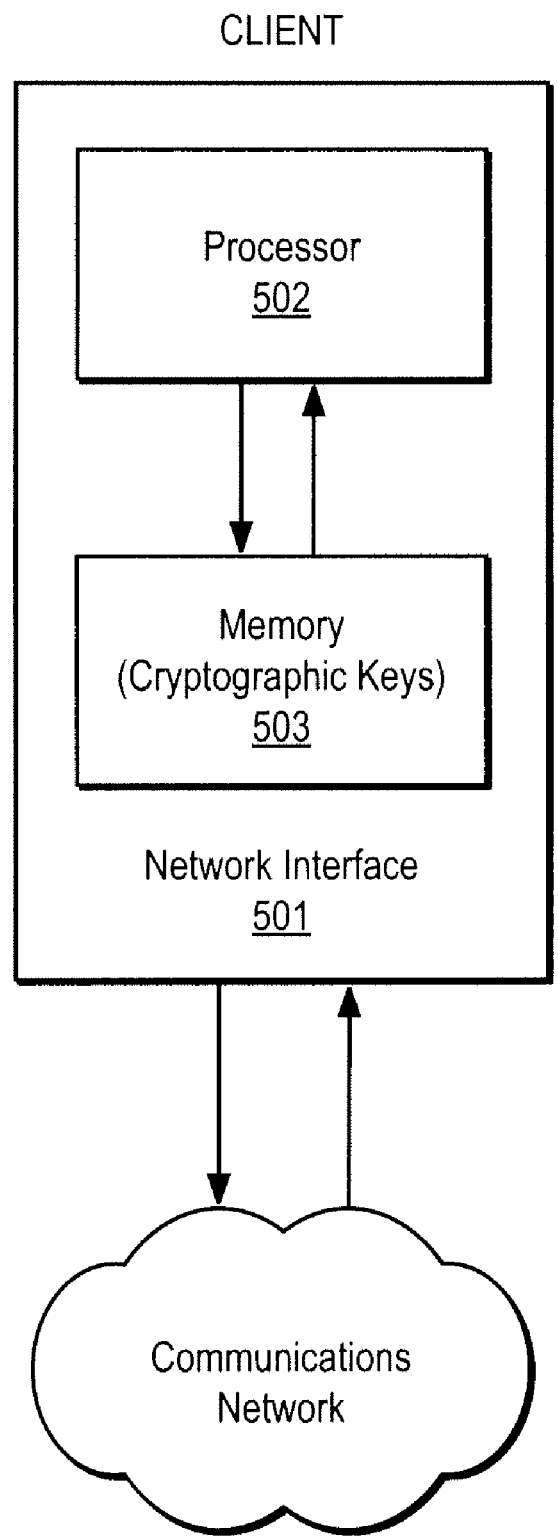
FIG. 5 illustrates one embodiment of a client component.

Embodiments of a Client, Server and a System for Single-Database Computational Private Information Retrieval The client component may be a hardware apparatus (e.g., circuitry, dedicated logic, etc.), software apparatus (such as is run on a general purpose computer system or a dedicated machine), or a combination of both, capable of performing processing logic. FIG. 5 is a block diagram of one embodiment of the client. Referring to FIG. 5, the client comprises an external network interface 501 through which a request for a database item can be made by executing the method of generating queries and transmitting the response; and a processor 502 coupled to external network interface 501 and the memory 503. In one embodiment, processor 502 receives a response for the database and is capable of applying a method for reconstruction and thereby obtaining the item contained in the database in which it is interested.

Figure 6:
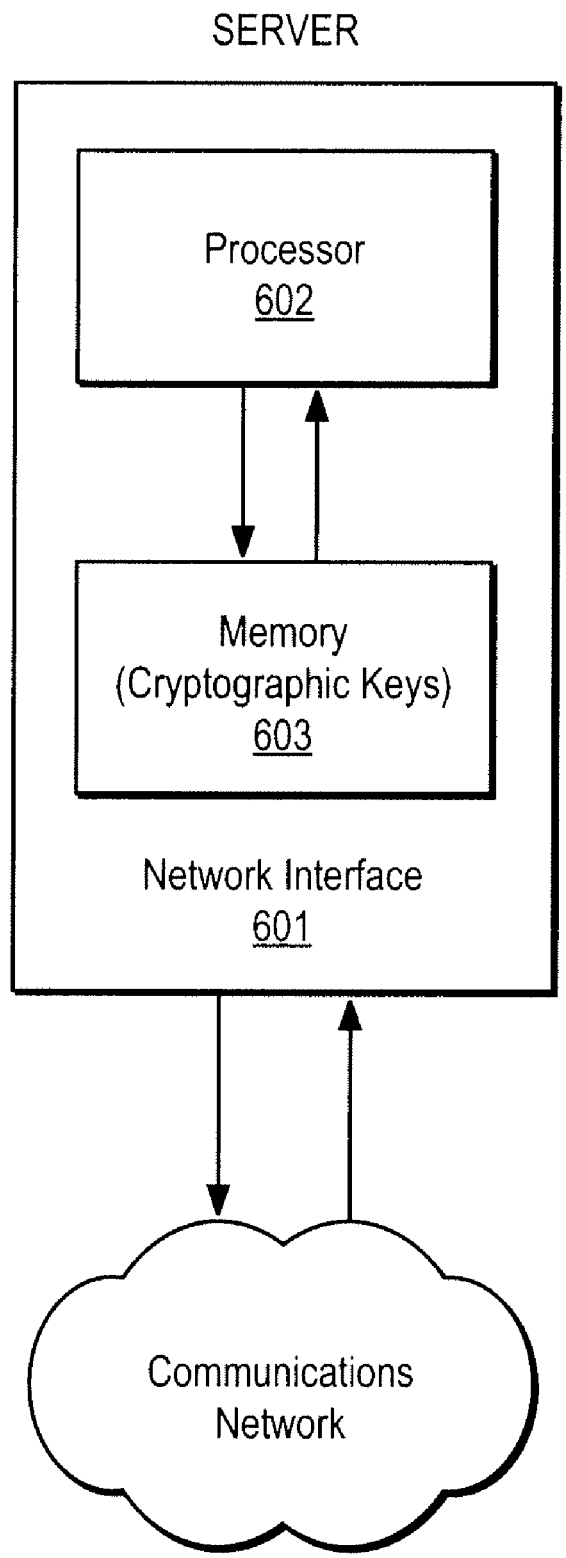
FIG. 6 illustrates one embodiment of a server component.
Figure 7:
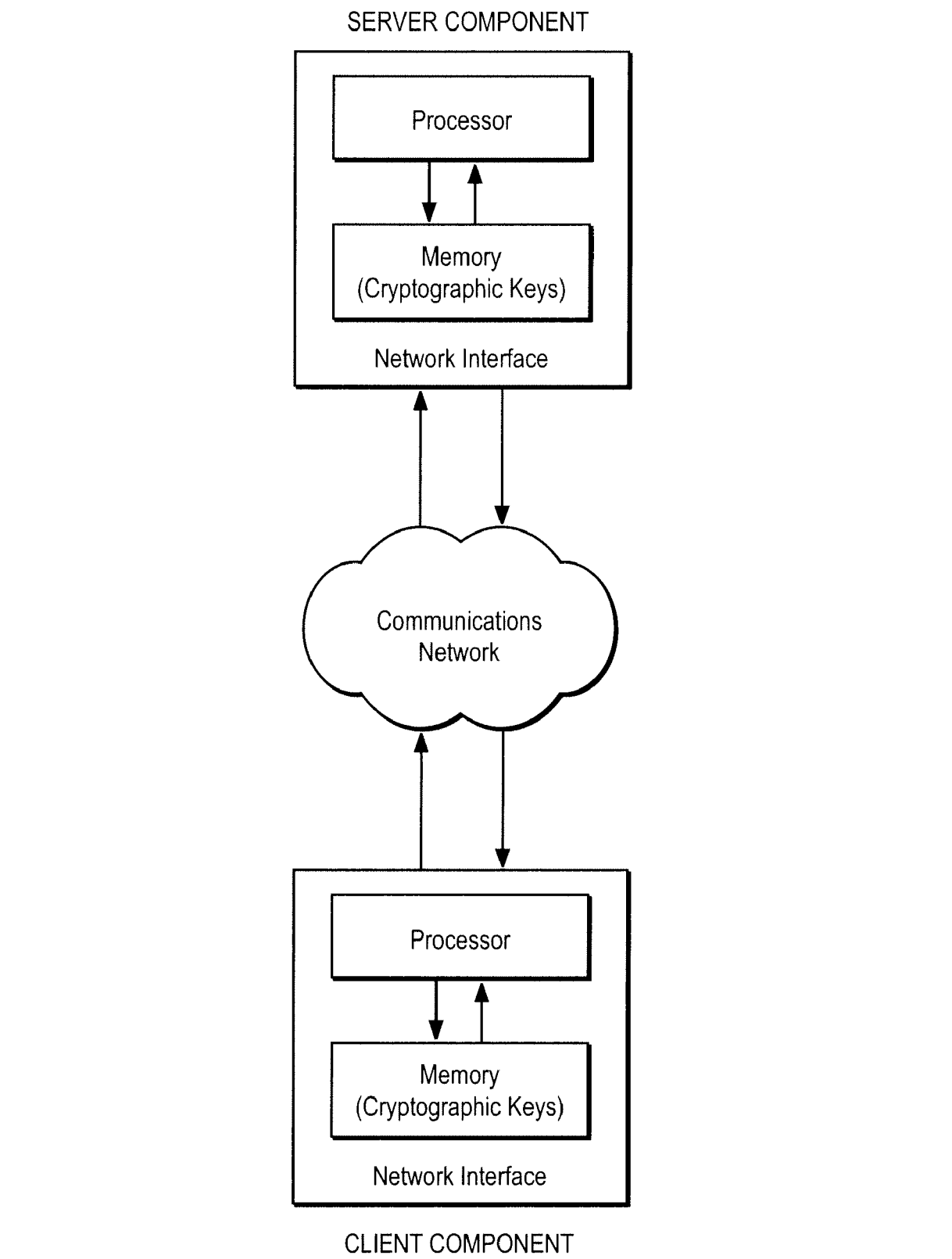
FIG. 7 illustrates one embodiment of a system configuration with a client component.

The server component may be a hardware apparatus (e.g., circuitry, dedicated logic, etc.), software apparatus (such as is run on a general purpose computer system or a dedicated machine), or a combination of both, capable of performing processing logic. FIG. 6 is a block diagram of one embodiment of the client. Referring to FIG. 6, the server comprises an external network interface 601 through which a request for a database item can be received; and a processor 602 coupled to the external network interface and the memory. The processor transmits to the network the output given by a method for generating a database response, where the second and third inputs are taken from the request.

A system for communicating data between a client and server provides single-database computational private information retrieval may be considered. Such a system comprises a client component capable of generating database queries and transmitting such queries over a communications network to a server; and receiving a response via a communications network from the server and reconstructing the database item in which it is interested; and a server component is capable of generating a database response and transmitting such response over a communications network to a client.

Logarithmic Oblivious Transfer

In Oblivious Transfer, the server's privacy is also maintained in the sense that the querier should only be permitted to retrieve a single bit of information. The techniques described herein for the private information retrieval scheme can be modified to provide for oblivious transfer.

In one embodiment, a generic composition paradigm for composing a somewhat inefficient oblivious transfer scheme is defined with an efficient private information retrieval scheme to achieve an efficient oblivious transfer scheme. Next, how the existing private information retrieval scheme described above can be converted to such a somewhat inefficient oblivious transfer scheme is specified. The composition paradigm works since the inefficient oblivious transfer component only operates on small inputs, whereas the more efficient private information retrieval component operates on larger size inputs. By applying the composition paradigm, an oblivious transfer scheme is obtained that achieves logarithmic total communication.

The techniques for the Private Information Retrieval described above allow the querier to recover (at least) log m bits, where m is the size of the database. To modify the scheme, the scheme allows the querier to only recover a single bit from a given l-bit (l$\approx$log m) block $C_i$, but also prevents the querier from recovering bits from more than one block.

In the following, let $OT_l$ be an existing oblivious transfer scheme, which takes as input an l-bit string $C_i$ and the querier's query $qOT_{l,j}$, and outputs a response $OT_l(C_{i,qOT_{l,j}})=r_{ij}$. One can use a variety of oblivious transfer schemes, subject to the constraint that $|q_{OT_{l,j}}|+|r_i|=O(|C_i|)$. In one embodiment, this constraint is used so that the communication complexity of the Oblivious Transfer scheme is O(log m). Using this Oblivious Transfer scheme, the techniques of the private information retrieval scheme described above may be modified so that it ensures that a querier cannot recover more than a single bit of any block.

An Example of a Process for Oblivious Transfer Query Generation

Figure 8:
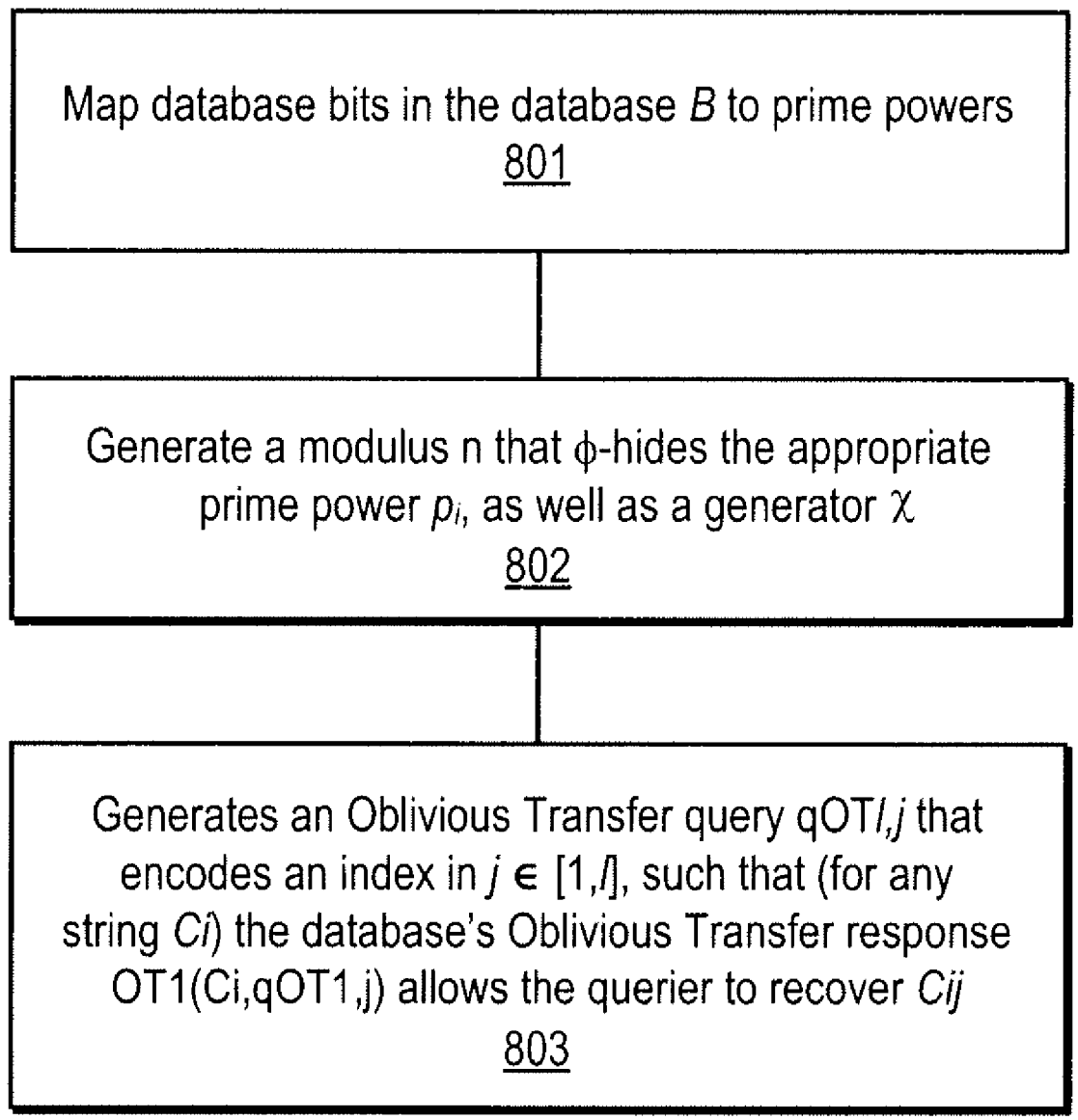
FIG. 8 is a flow diagram of one embodiment of a method for oblivious transfer query generation.

FIG. 8 is a flow diagram of one embodiment of a method for oblivious transfer query generation. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the operations in the flow diagram are performed by a querier.

Referring to FIG. 8, the process begins by processing logic mapping database bits in the database B to prime powers (processing block 801). This occurs in the same way as above, except that it is possible that the prime powers could be smaller or larger than original (even though the base prime numbers are the same). In one embodiment, since each prime power is greater than $2^{max\{ri\}}$ (as opposed to originally, where each prime power needed to be greater than $2^l$), the database's responses can be encoded losslessly.

Next, processing logic in the querier generates a modulus n that $\phi$-hides the appropriate prime power p, as well as a generator $\chi$ (processing block 802). This supposes that the querier is interested in database bit $C_{ij}$—the jth bit, j$\in$[1,l], in block $C_i$.

Thereafter, processing logic in the querier generates an Oblivious Transfer query $q_{OT_{l,j}}$ that encodes an index in j$\in$[1, l], such that (for any string $C_i$) the database's Oblivious Transfer response $OT_l(C_i,q_{OT_{l,j}})$ allows the querier to recover $C_{ij}$ (processing block 803).

An Example of a Process for Oblivious Transfer Response Generation

FIG. 9 is a flow diagram of one embodiment of a process for the oblivious transfer query generation. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the operations in the flow diagram are performed by the database.

Referring to FIG. 9, the process begins by processing logic computing e such that $e=r_{ij} (\bmod p_i)$ for all i (processing block 901). Next, processing logic computes the value $x^e$ (modn) (processing block 902) and then sends this value to the querier (processing block 903).

An Example of a Process for Oblivious Transfer Reconstruction

FIG. 10 is a flow diagram of one embodiment of a process for the oblivious transfer response retrieval. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the operations set forth in FIG. 10 are performed by the querier.

Referring to FIG. 10, the process begins by processing logic recovering $r_{ij}$ (processing block 1001). In one embodiment, processing logic performs the recovery in the same way that $C_i$ is recovered in the reconstruction processes for private information retrieval. After recovering $r_{ij}$, processing logic recovers bit $C_{ij}$ from the oblivious transfer response $r_{ij}$ (processing block 1002).

Analysis of Oblivious Transfer Processes

The above approach ensures that the querier cannot recover more than one bit from any single block $C_i$, but it does not guarantee that the querier cannot recover one bit from more than one block. For example, the querier could choose n so that it φ-hides two prime powers $p_{i1}$ and $p_{i2}$; in this case, the database's Oblivious-Transfer-supplemented response above would give the querier two database bits—namely, $C_{i1j}$ and $C_{i2j}$.

To address this problem, in one embodiment, a technique is used to ensure that the database can be sure that the querier cannot benefit from φ-hiding more than one prime power in n. For the sake of argument, imagine that the database could be sure that φ(n) is divisible by only one of the prime powers $p_i$ and is relatively prime to the rest. Further, suppose that e' is the smallest integer that is congruent to $r_{ij}$ modulo $p_i$, and that instead of setting e=e' (as in the above scheme), the database selects a random number z from a suitably large range (e.g., $[1,n^2]$) and sets $e=e'+z\Pi_i p_i$ and sends $x^e$ (modn) to the querier. (Notice that e still satisfies the necessary modular equations when chosen in this way.) With respect to whether the querier can obtain any information about the value of $C_{i2j}$ in this scenario if $p_{i2}$ is relatively prime to φ(n), the answer is that the querier can at best get negligible information, even if it has unbounded computational power and knows every other bit in the database, because the only information that the querier gets about $C_{i2j}$ is embedded in e. In particular, the only information that the querier can derive about e is as follows:

1. The value of e mod φ(n). (The querier may be able to recover this value from by computing the discrete logarithm of $x^e$ for base x, though this is a hard problem.)

2. That $e=e'_0+z\Pi_i p_i$ or $e=e'_1+z\Pi_i p_i$ for $z\epsilon[1,n^2]$ where $e'=e'_0$ if $C_{ij}=0$ and $e'=e'_1$ if $C_{ij}=1$. (The querier knows this since this is how the database computes e.)

Now, the question is whether the querier can distinguish which of the two possibilities ($e=e'_0+z\Pi_i p_i$) or ($e=e'_1+z\Pi_i p_i$) is true. It cannot (except with negligible advantage), because the difference between the conditional probabilities (conditional on the querier's information about e) of the two events is negligible. Setting $e\phi(n)\equiv e \bmod \phi(n)$, there are either $\lfloor n^2/\phi(n)\rfloor$ or $\lceil n^2/\phi(n)\rceil$ possible values of e that satisfy $e=e\phi(n) \bmod \phi(n)$ and $e=e'_0+z\Pi_i p_i$ for $z\epsilon[1,n^2]$. The situation is the same for the second set of equations: $e=e\phi(n) \bmod \phi(n)$ and (n) and ($e=e'_1+z\Pi_i p_i$) for $z\epsilon[1,n^2]$. One can verify that the difference between the conditional probabilities is therefore at most $1/(\lfloor n^2/\phi(n)\rfloor+\lfloor n^2/\phi(n)\rfloor)$, which is negligible.

In one embodiment, the user chooses n such that φ(n) is divisible by only one of the prime powers $p_i$ and is relatively prime to the rest. Note if the querier does not cheat (and φ(n) is relatively prime to all of the prime powers except the one ($p_i$) that divides it), then any number in Z/nZ will have a unique ($\Pi_{k\neq i} P_k$)-th root modulo n. However, if the user does cheat, the root (if it exists at all) will not be unique. To prevent cheating, therefore, the database masks the bits in the block $C_i$ with a pseudorandom sequence generated from the unique ($\Pi_{k\neq i} P_k$)-th root that the non-cheater can compute but the cheater cannot. (It then generates $r_{ij}$ from this masked string rather than the original $C_i$.)

In one embodiment, methods for the overall refined Oblivious Transfer scheme is described below.

An Alternative Embodiment of a Process for Query Generation for Oblivious Transfer

In one embodiment, the process for query generation for oblivious transfer query generation is same as the process described above.

An Alternative Embodiment of a Process for Response Generation

Figure 11:
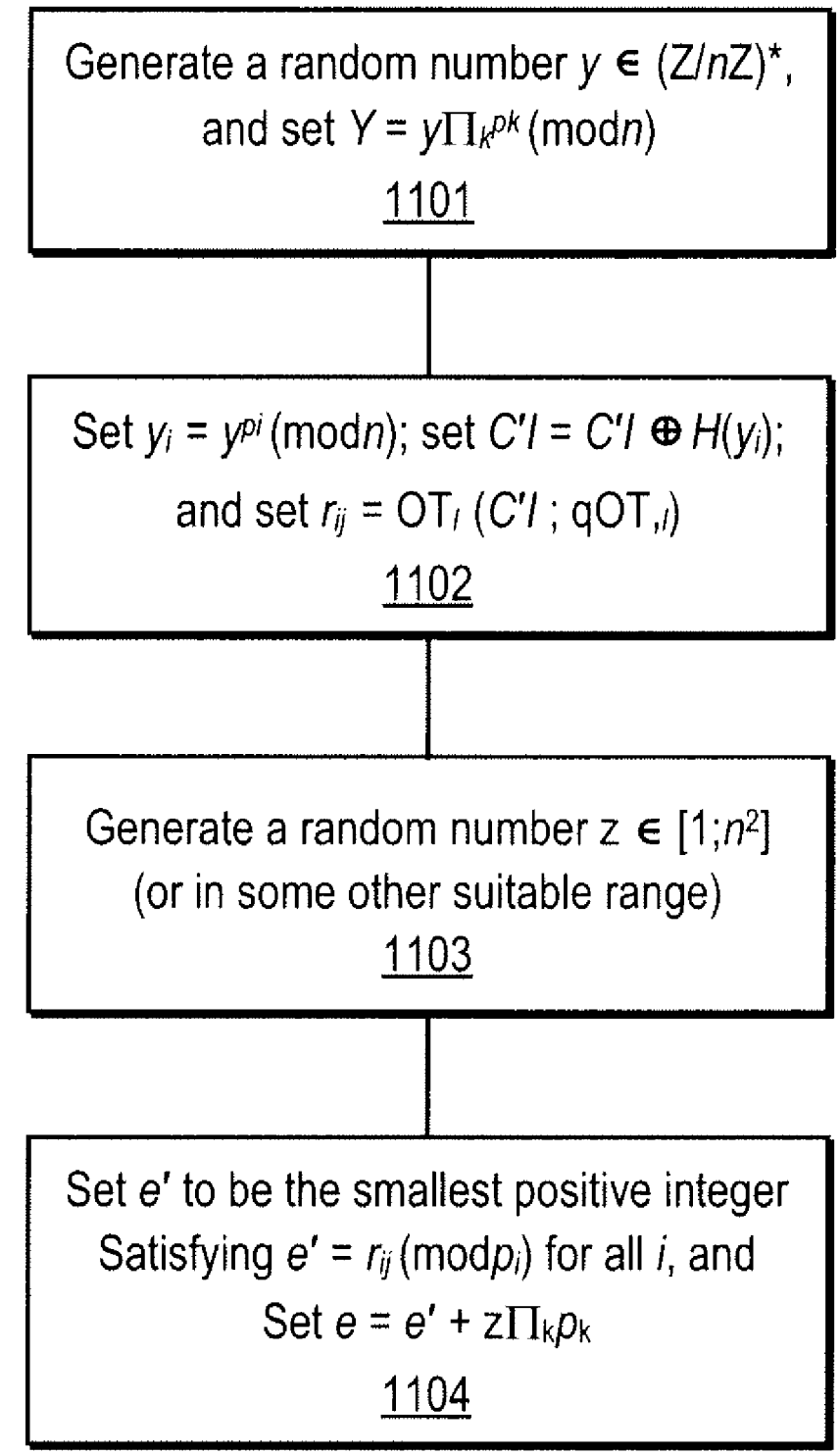
FIG. 11 is a flow diagram of an alternative embodiment of a process for response generation.

FIG. 11 is a flow diagram of an alternative embodiment of a process for response generation. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the operations set forth in FIG. 11 are performed by the database.

Referring to FIG. 11, the process begins by processing logic processing logic generating a random number $y\epsilon(Z/nZ)^*$, and sets $Y=y\Pi_k^{p_k}$ (modn)(processing block 1101). For each block $C_i$, processing logic sets $y_i=y^{p_i}$(modn); sets $C'_i=C'_i\oplus H(y_i)$; and sets $r_{ij}=OT_1(C'_i; qOT_i)$ (processing block 1102). Then, processing logic generates a random number $z\epsilon[1,n^2]$ (or in some other suitable range) (processing block 1103). Afterwards, processing logic sets e' to be the smallest positive integer satisfying $e'=r_{ij}(\bmod p_i)$ for all i, and sets $e=e'+z\Pi_k p_k$ (processing block 1104) and sends the response (Y,r), where $r=x^e$ (modn) (processing block 1105).

Figure 12:
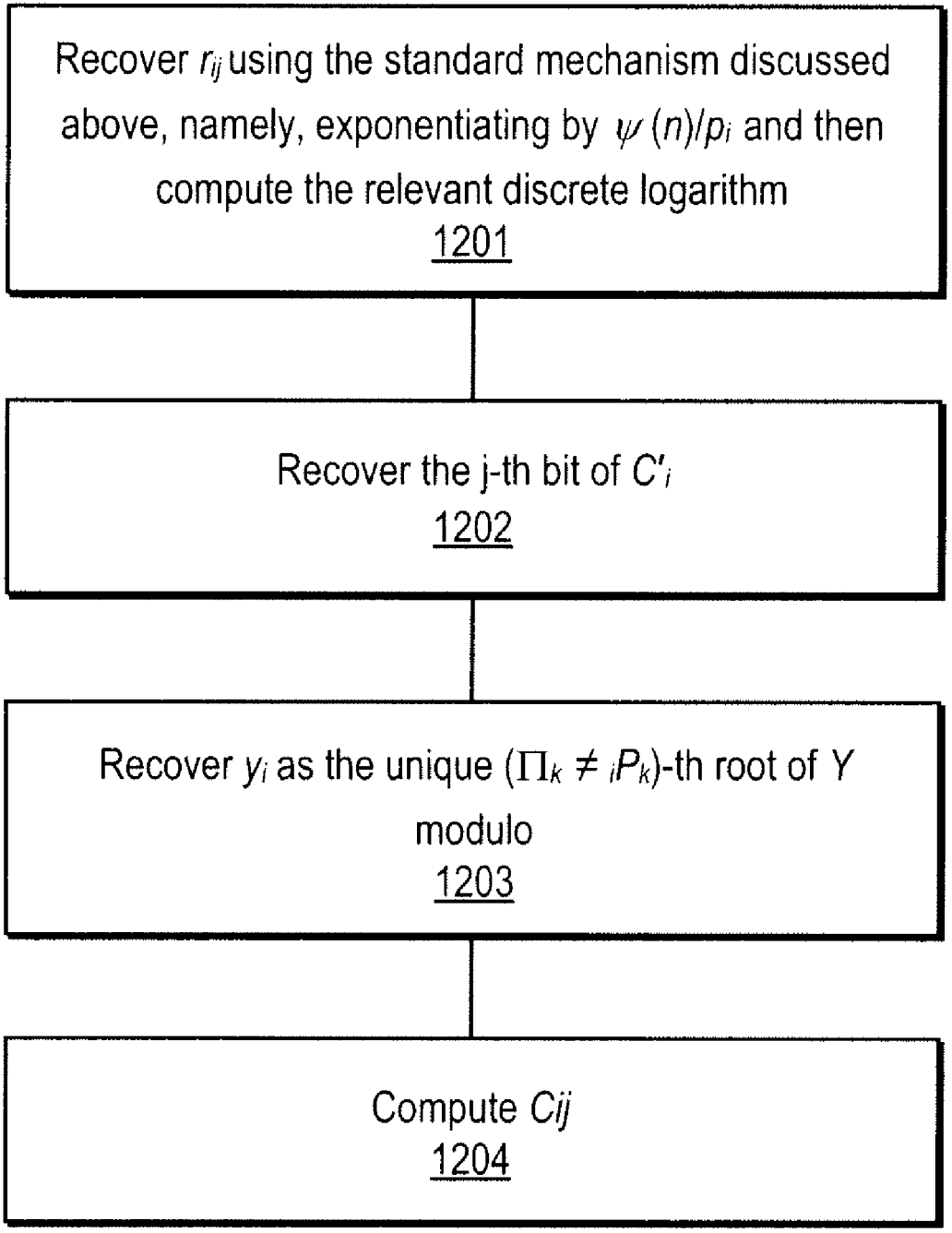
FIG. 12 is a flow diagram of an alternative embodiment of a process for the oblivious transfer response retrieval.

FIG. 12 is a flow diagram of an alternative embodiment of a process for the oblivious transfer response retrieval. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the operations set forth in FIG. 12 are performed by the querier.

Referring to FIG. 12, the process begins by processing logic recovering $r_{ij}$ using the standard mechanism discussed above, namely, exponentiating by $\phi(n)/p_i$ and then computing the relevant discrete logarithm (processing block 1201). Using $r_{ij}$, processing logic recovers the j-th bit of $C'_i$ (processing block 1202). Then, processing logic recovers $y_i$ as the unique $(\Pi_{k\neq i}P_k)$-th root of Y modulo n (processing block 1203). Lastly, from $C_{ij}$ and $H(y_i)$, processing logic computes $C_{ij}$ (processing block 1204).

The only security property needed from the function H is that the resulting bit be unpredictable. There are numerous methods known to one with ordinary skill in the art for achieving this aim. Such methods may include, but are not limited to the use of a hard-core bit; the use of a secure cryptographic hash function such as SHA-1; and the use of a semantically secure encryption scheme.

An Example of an Oblivious Transfer Client

The oblivious transfer client component may be a hardware apparatus (e.g., circuitry, dedicated logic, etc.), software apparatus (such as is run on a general purpose computer system or a dedicated machine), or a combination of both, capable of performing processing logic. In one embodiment, the component has similar components to the client component of FIG. 5. For example, the component comprises an external network interface through which a request for a database item can be made. However, the oblivious transfer client does so by executing the method of generating oblivious transfer queries and transmitting the response. The component further comprises a processor coupled to the external network interface and the memory. The processor receives a response for the oblivious transfer database and is capable of applying a reconstruction process to obtain the item contained in the database in which it is interested.

An Example of an Oblivious Transfer Server

The oblivious transfer server component may be a hardware apparatus (e.g., circuitry, dedicated logic, etc.), software apparatus (such as is run on a general purpose computer system or a dedicated machine), or a combination of both, capable of performing the processing described above. In one embodiment, the component has similar components to the client component of FIG. 6. For example, the server component comprises an external network interface through which a request for a database item can be received. The component further comprises a processor coupled to the external network interface and the memory. The processor transmits to the network the output given by a process for generating an oblivious transfer database response where the second and third inputs are taken from the request.

System for Single-Database Computational Private Information Retrieval

One embodiment of a system communicates data between a client and server to provide single-database oblivious transfer. In one embodiment, the system comprises a client component is capable of oblivious transfer database queries and transmitting such queries over a communications network to a server and an oblivious transfer response via a communications network from the server and reconstructing the database item in which it is interested. In one embodiment, the server component generates a database response and transmitting such a response over a communications network to a client.

Nesting Private Information Retrieval Methods to Achieve Oblivious Transfer

An inefficient oblivious transfer scheme may be constructed using the private information retrieval scheme described above. When this inefficient scheme is composed with the private information retrieval scheme described herein, the resulting scheme is an efficient oblivious transfer scheme.

The composition is efficient since the "inefficient" oblivious transfer scheme only operates on small input values, whereas the efficient private information retrieval scheme operates on large input values. The scheme is a modification of the private information retrieval scheme, wherein the value l is chosen to be equal to m. In this case, the resulting database is divided into m blocks, each constituting one bit. As above, each value is masked using a pseudorandom sequence generated from the unique $(\Pi_{k\neq i}P_k)$th root that the non-cheater can compute but the cheater cannot.

The above oblivious transfer scheme has O(m) computation for the querier (rather Than the $O(\sqrt{m})$ computation as in the private information retrieval scheme), since the querier Computes a modular root. However, using a technique known in the art of nested private information retrieval schemes, a user computation of $O(m^{1/c})$ may be obtained at the expense of increasing the scheme's communication complexity by a factor of $f^{c-1}$, where $f$ is the constant representing the minimum tolerable value of (log n)/|P|.

The processes described herein can be extended to achieve Oblivious File Transfer. The example scenario is that the querier wants a file from the database, and the database wants to limit the user to one file per query. It is possible to construct a more efficient solution than the bit-wise solution by associating each file with a prime power (rather than each 1-bit string). A long file can be obliviously transferred with only constant-factor ciphertext expansion.

One Embodiment of a Computer System

Figure 13:
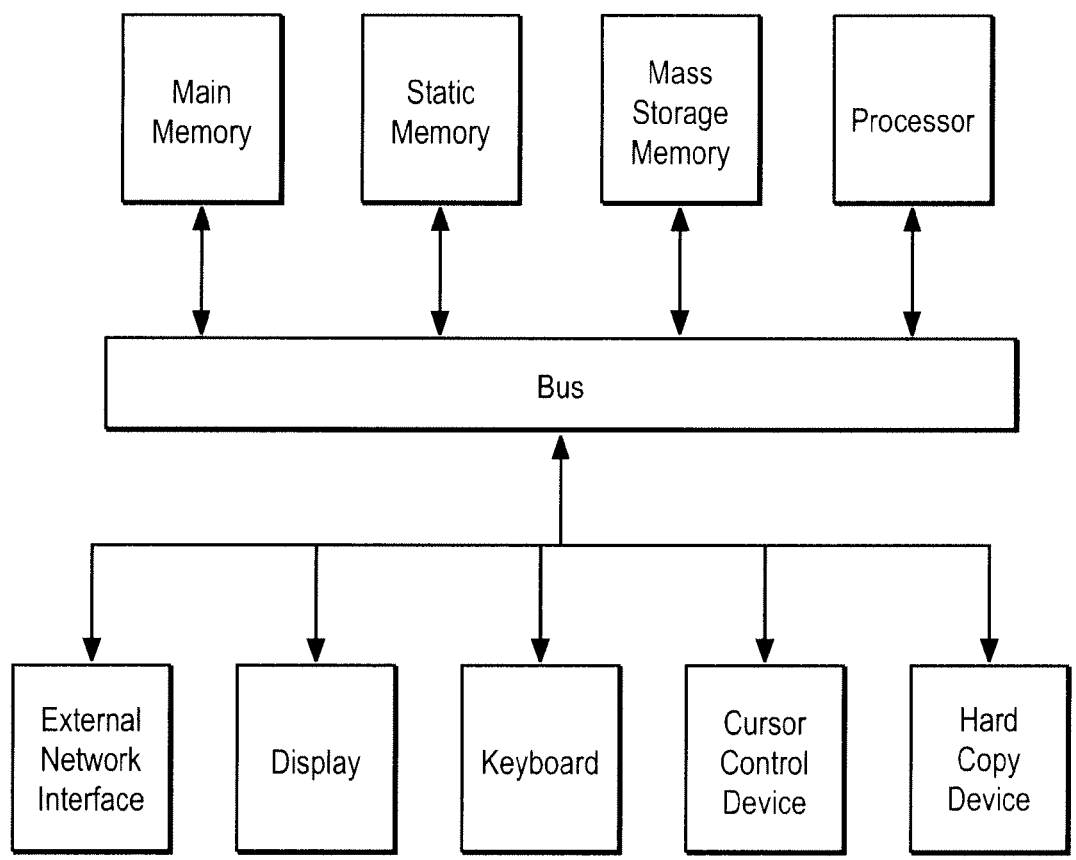
FIG. 13 illustrates an example of one embodiment of a computer system.

FIG. 13 is a block diagram of an exemplary computer system that may perform one or more of the operations described herein. Referring to FIG. 13, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc.

The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, an a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (LCD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display.

Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A polylogarithmic single database computational private information retrieval process comprising:
    generating a query that encodes the index into an arithmetic function to avoid revealing to the database the index;
    communicating the query to the database for execution of the arithmetic function against the entirety of the database;
    receiving results of the execution of the arithmetic function from the database, wherein the total amount of information exchanged with the database is within a constant factor of the logarithm of the size of the database; and
    performing reconstruction on the results by:
        determining a first value by exponentiating a first input base to a power equal to a function applied to a modulus divided by a prime power associated with a specified index and performing a modulo operation using a modulus on a result of exponentiating the first input base,
        determining a second value by exponentiating a second input base to the prime power and performing a modulo operation using the modulus on a result of exponentiating the first input base,
        arithmetically determining a third value based on a discrete logarithm of the second value with respect to a base equal to the first value, and generating at least one bit associated with the query from the third value.

2. The process defined in claim 1 wherein the function is the Euler totient function.

3. The process defined in claim wherein the first, second and third values are computed off-line.

4. The process defined in claim 1 wherein the query comprises O(log m) bits, wherein m equals the number of elements stored in the database.

5. A polylogarithmic single database computational private information retrieval process comprising:
    generating a query that encodes the index into an arithmetic function to avoid revealing to the database the index, wherein the query comprises an arithmetic function of the index and a secret value that is an arithmetic function of the index, wherein the arithmetic function includes a multiplication group specified by a modulus of a random value whose order is divisible by a prime power;
    communicating the query to the database for execution of the arithmetic function against the entirety of the database;
    receiving results of the execution of the arithmetic function from the database, wherein the total amount of information exchanged with the database is within a constant factor of the logarithm of the size of the database.

6. The process defined in claim 5 wherein the prime power is an order of the random value, and wherein the secret value comprises the factorization into prime numbers of the modulus.

7. An article of manufacture having one or more recordable media storing instructions thereon which, when executed by a system, cause the system to perform a polylogarithmic single database computational private information retrieval process comprising:
    generating a query that encodes the index into an arithmetic function to avoid revealing to the database the index;
    communicating the query to the database for execution of the arithmetic function against the entirety of the database;
    receiving results of the execution of the arithmetic function from the database, wherein the total amount of information exchanged with the database is within a constant factor of the logarithm of the size of the database; and
    performing reconstruction on the results by
        determining a first value by exponentiating a first input base to a power equal to a function applied to a modulus divided by a prime power associated with a specified index and performing a modulo operation using a modulus on a result of exponentiating the first input base,
        determining a second value by exponentiating a second input base to the prime power and performing a modulo operation using the modulus on a result of exponentiating the first input base,
        arithmetically determining a third value based on a discrete logarithm of the second value with respect to a base equal to the first value, and
        generating at least one bit associated with the query from the third value.

8. The article of manufacture defined in claim 7 wherein the function is a Euler totient function.

9. The article of manufacture defined in claim 7 wherein the first, second and thrid values are computed off-line.

10. The article of manufacture defined in claim 7 wherein the query comprises O(log m) bits, wherein m equals the number of elements stored in the database.

11. An article of manufacture having one or more recordable media storing instructions thereon which, when executed by a system, cause the system to perform a polylogarithmic single database computational private information retrieval process comprising:
    generating a query that encodes the index into an arithmetic function to avoid revealing to the database the index, wherein the query comprises an arithmetic function of the index and a secret value that is an arithmetic function of the index, wherein the arithmetic function includes a multiplication group specified by a modulus of a random value whose order is divisible by a prime power;
    communicating the query to the database for execution of the arithmetic function against the entirety of the database;
    receiving results of the execution of the arithmetic function from the database, wherein the total amount of information exchanged with the database is within a constant factor of the logarithm of the size of the database.

12. The article of manufacture defined in claim 11 wherein the prime power is an order of the random value, and wherein the secret value comprises the factorization into prime numbers of the modulus.

13. An apparatus comprising: an external network interface through which a request for information is made; a memory; and a processor, coupled to the external network interface and the memory, to:
    generate a query that encodes the index into an arithmetic function to avoid revealing to the database the index, wherein the query comprises an arithmetic function of the index and a secret value that is an arithmetic function of the index, wherein the arithmetic function includes a multiplication group specified by a modulus of a random value whose order is divisible by a prime power;

communicate the query to the database for execution of the arithmetic function against the entirety of the database;

receive results of the execution of the arithmetic function from the database, wherein the total amount of information exchanged with the database is within a constant factor of the logarithm of the size of the database.

14. The apparatus defined in claim 13 wherein the prime power is an order of the random value, and wherein the secret value comprises the factorization into prime numbers of the modulus.

15. The apparatus defined in claim 13 wherein the query comprises O(log m) bits, wherein m equals the number of elements stored in the database.

* * * * *